United States Patent [19]

Hardt

[11] 4,185,508
[45] Jan. 29, 1980

[54] MOTION CHANGE TRANSMISSION

[76] Inventor: Peter J. Hardt, 352 N. Main St., Juneau, Wis. 53039

[21] Appl. No.: 804,617

[22] Filed: Jun. 8, 1977

[51] Int. Cl.² ............................................. F16H 25/08
[52] U.S. Cl. ............................................. 74/53; 74/56; 91/186; 91/504; 123/58 R
[58] Field of Search .................. 74/53, 54, 55, 56, 57, 74/60; 91/262, 186, 499–507; 123/58 R, 58 A, 58 AA, 58 AB, 58 AM, 58 B, 58 BA, 58 BB, 58 BC, 58 C

[56] References Cited

U.S. PATENT DOCUMENTS

| 463,008 | 11/1891 | Sundet et al. | 74/53 |
|---|---|---|---|
| 942,222 | 12/1909 | Smith | 74/54 |
| 1,125,684 | 1/1915 | Greenberg et al. | 74/56 |
| 1,127,065 | 2/1915 | Milne | 123/58 BB |
| 1,738,512 | 12/1929 | Andrews | 74/53 |
| 1,772,531 | 8/1930 | Williams | 123/58 AA |
| 1,809,489 | 6/1931 | Nemetz | 91/503 X |
| 1,831,857 | 11/1931 | Goodnow | 308/31 |
| 1,912,284 | 5/1933 | LaBrie | 91/503 |
| 2,233,630 | 3/1941 | Miller | 74/60 |
| 3,828,741 | 8/1974 | Bixier | 123/58 AB |
| 4,103,556 | 8/1978 | Niday | 74/60 X |

FOREIGN PATENT DOCUMENTS

| 2853 | 7/1926 | Australia | 74/56 |
|---|---|---|---|
| 1951789 | 6/1970 | Fed. Rep. of Germany | 91/502 |
| 622274 | 5/1927 | France | 74/60 |
| 923521 | 2/1947 | France | 74/57 |
| 207622 | 12/1923 | United Kingdom | 74/25 |
| 762777 | 12/1956 | United Kingdom | 74/60 |

*Primary Examiner*—Lawrence J. Staab
*Attorney, Agent, or Firm*—Andrus, Sceales, Starke & Sawall

[57] ABSTRACT

A motion change transmission includes a rotor rotationally supported by and/or within a framing assemblage or housing. The face of the rotor is provided with alternating, axially and circumferentially extending hills and valleys. At least one rod is disposed transversely relative to the rotor and is pivotal in a given plane relative to the assemblage or housing and is operatively engageable with the face of the rotor such that when one end of the rod traverses a rotor hill, the other end of the rod simultaneously traverses a rotor valley. Either or both ends of the rod are connected to reciprocating members. When means are provided for driving the reciprocating members, the transmission provides for the conversion of reciprocating motion to rotary motion. And when means are provided for driving the rotor, the transmission provides for the conversion of rotary motion to reciprocating motion.

36 Claims, 28 Drawing Figures

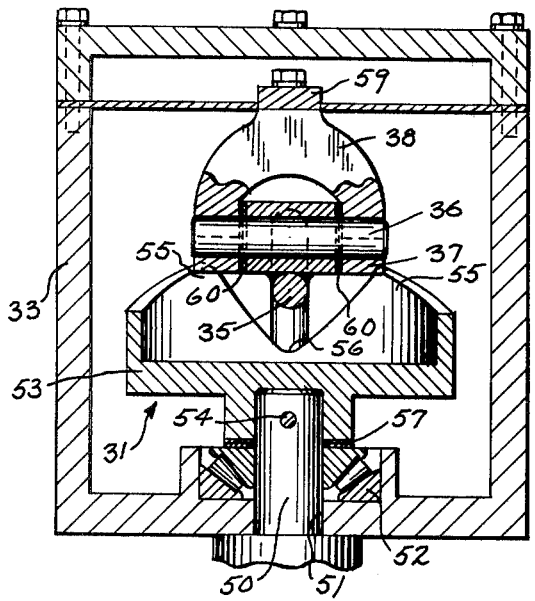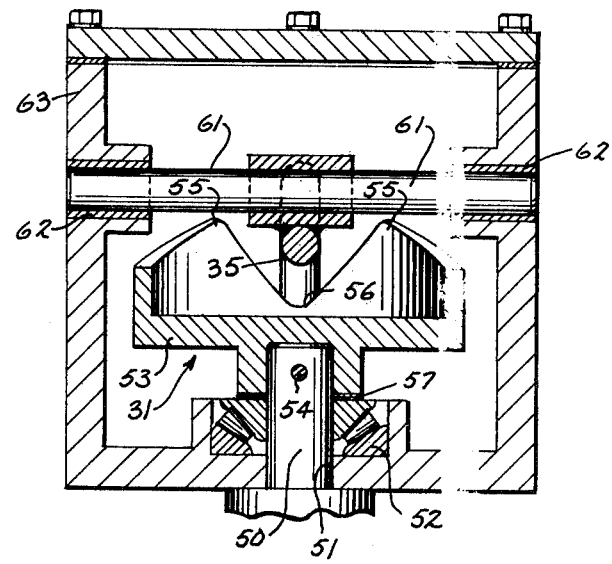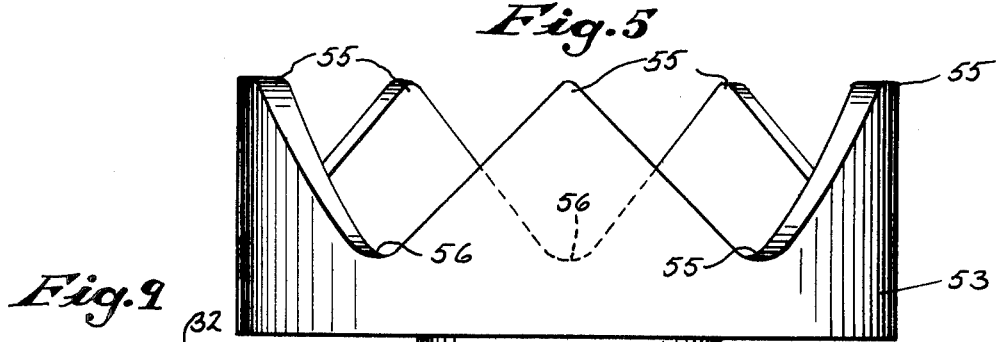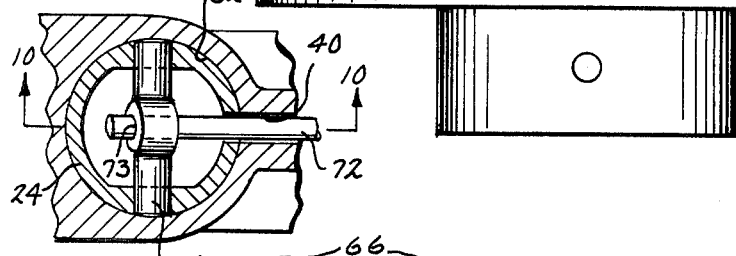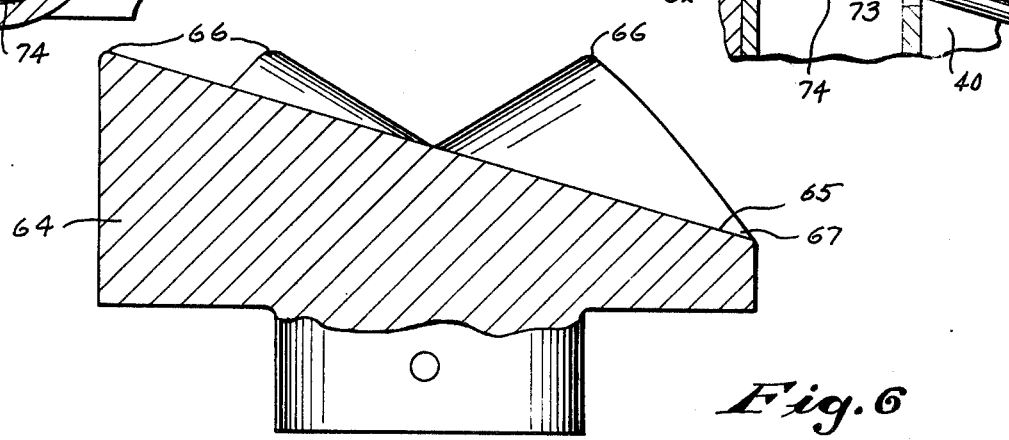

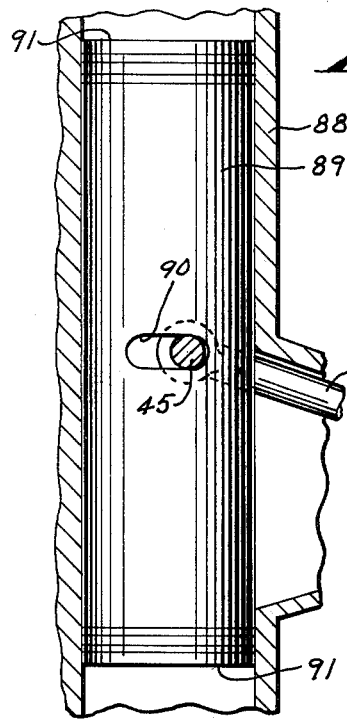
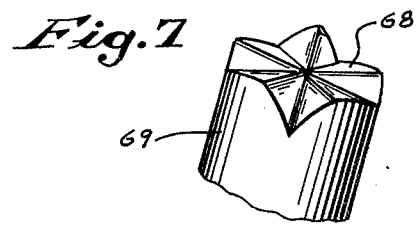
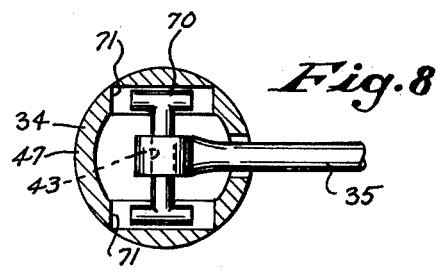
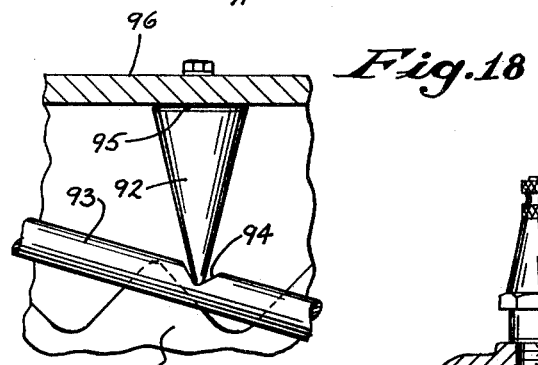
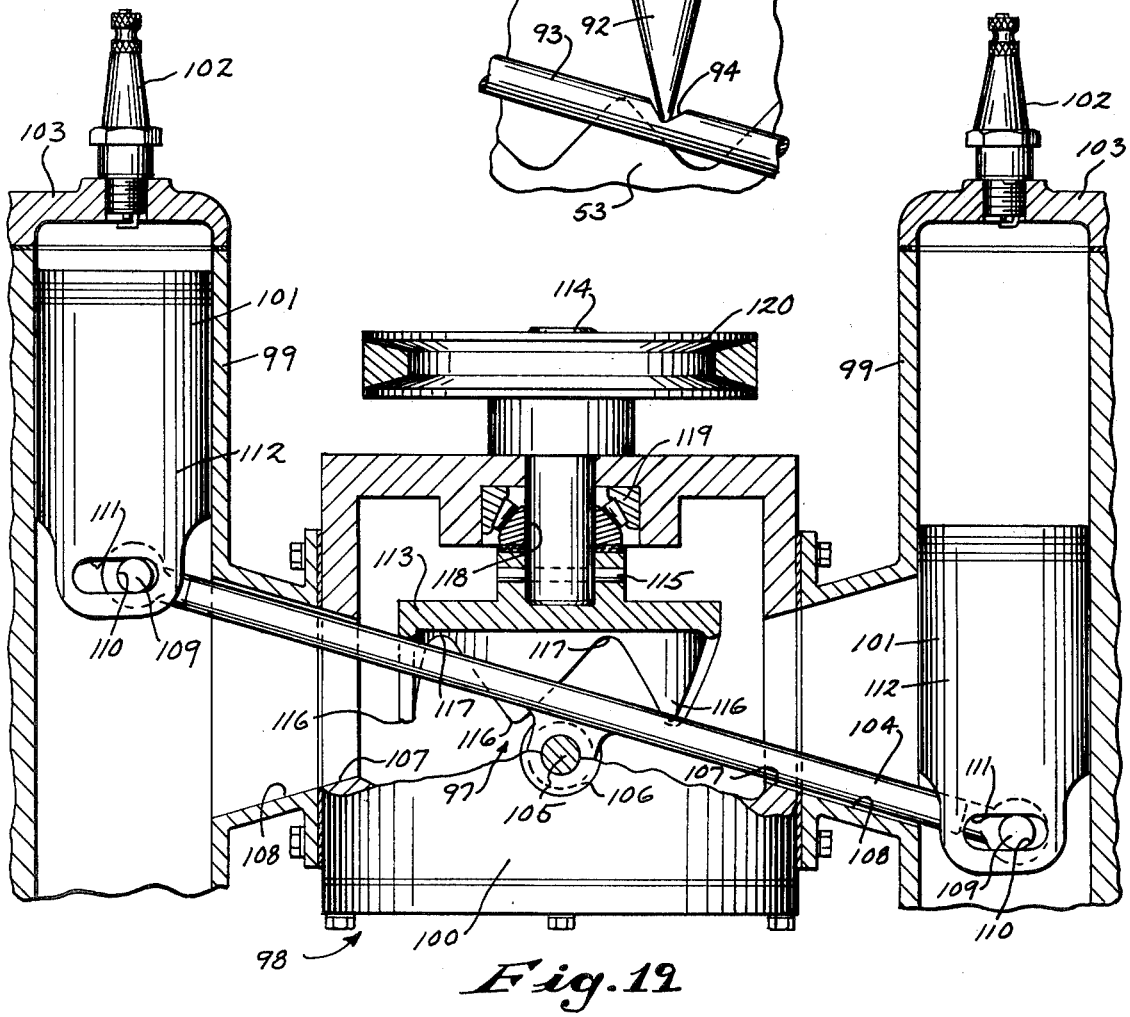

MOTION CHANGE TRANSMISSION

BACKGROUND OF THE INVENTION

The invention generally relates to a motion change transmission providing for the conversion of rotary motion to reciprocating motion and vice versa.

The motion change transmission of this invention is applicable to those situations where a working member reciprocates to perform its function. Thus, it could have wide application, for example, in farm machinery and for operating reciprocating pumps and compressors. The transmission could also have wide application in internal combustion engines. Certain limitations imposed by the conventional crankshaft are avoided by the transmission of this invention. It is generally an object of this invention to provide a relatively simple motion change transmission which could have wide application in diverse fields and provides for a more efficient engine.

SUMMARY OF THE INVENTION

Broadly the invention contemplates a motion change transmission having a rotor rotationally supported by and/or within a framing assemblage or housing. The face of the rotor is provided with alternating, axially and circumferentially extending hills and valleys. The transmission further includes at least one rod disposed transversely relative to the rotor for pivotal movement in a given plane relative to the assemblage or housing. The rod is operatively engageable with the face of the rotor such that when one end of the rod traverses a rotor hill the other end of the rod simultaneously traverses a rotor valley. Either or both ends of the rod are connected to reciprocating members. When means are provided for driving the reciprocating members, the transmission provides for the conversion of reciprocating motion to rotary motion. When means are provided for driving the rotor, the transmission provides for the conversion of rotary motion to reciprocating motion.

DESCRIPTION OF THE DRAWING FIGURES

The drawings furnished herewith illustrate the best mode presently contemplated for carrying out the invention and are described hereinafter.

In the drawings:

FIG. 3 is a sectional view taken generally on line 3—3 of FIG. 1;

FIG. 4 is a sectional view similar to that of FIG. 3 showing a further embodiment of the invention;

FIG. 5 is an enlarged side elevation of the rotary member of the motion change transmission;

FIG. 6 is an enlarged sectional elevation of a further embodiment of rotary member;

FIG. 7 is a perspective view showing a further embodiment of rotary member;

FIG. 8 is a sectional detail view showing a further embodiment of the connection between the piston and rod;

FIG. 9 is a sectional detail view showing still another embodiment of the connection between the piston and rod;

FIG. 10 is a sectional view taken generally on line 10—10 of FIG. 9;

FIG. 17 is a sectional elevation showing a double acting piston as might be employed in the compressor or pump of FIG. 1;

FIG. 18 is a detail view showing an embodiment wherein the bearing support for the rod is replaced by a fulcrum member;

FIG. 19 is a sectional elevation showing the motion change transmission of this invention as incorporated in an internal combustion engine shown only in part;

DESCRIPTION OF THE ILLUSTRATED EMBODIMENTS

Figure 1:
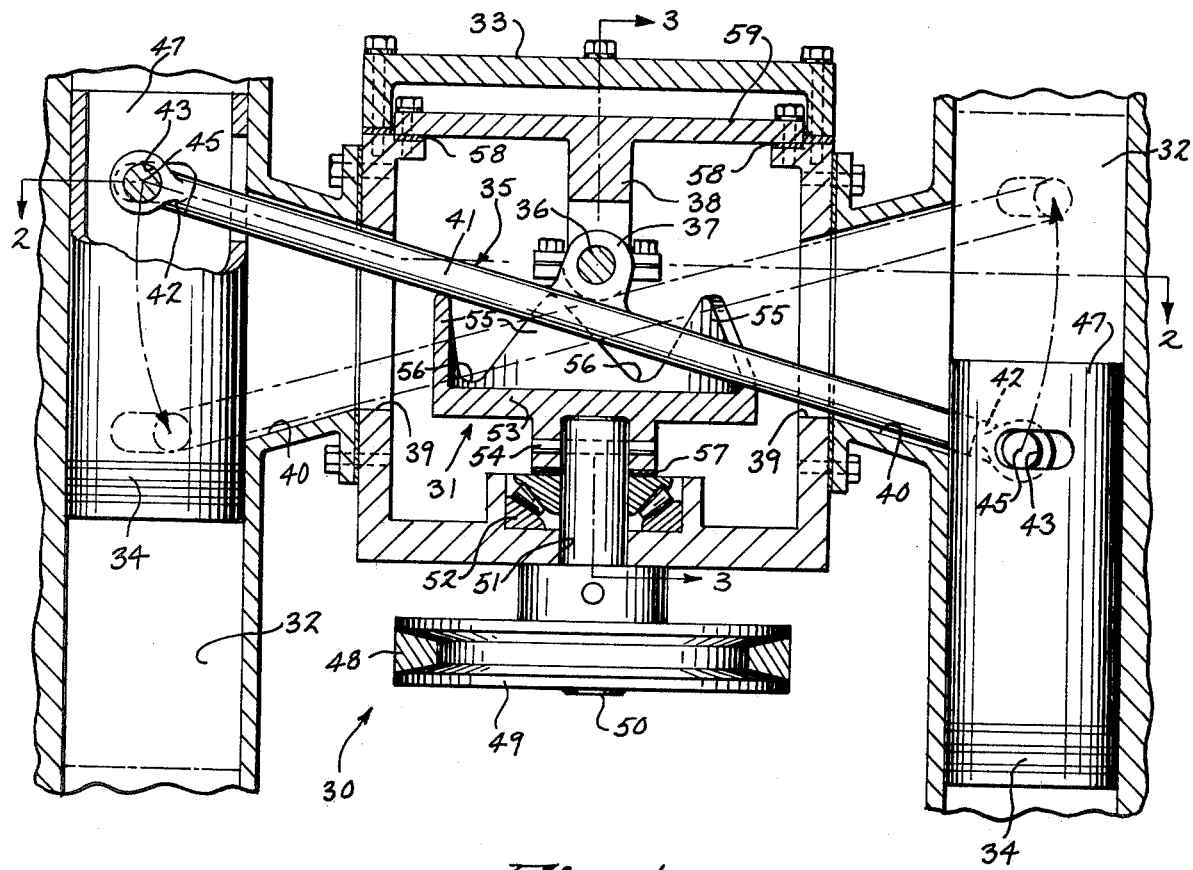
FIG. 1 is a sectional elevation showing the motion change transmission of this invention as incorporated in a compressor or pump shown only in part.
Figure 2:
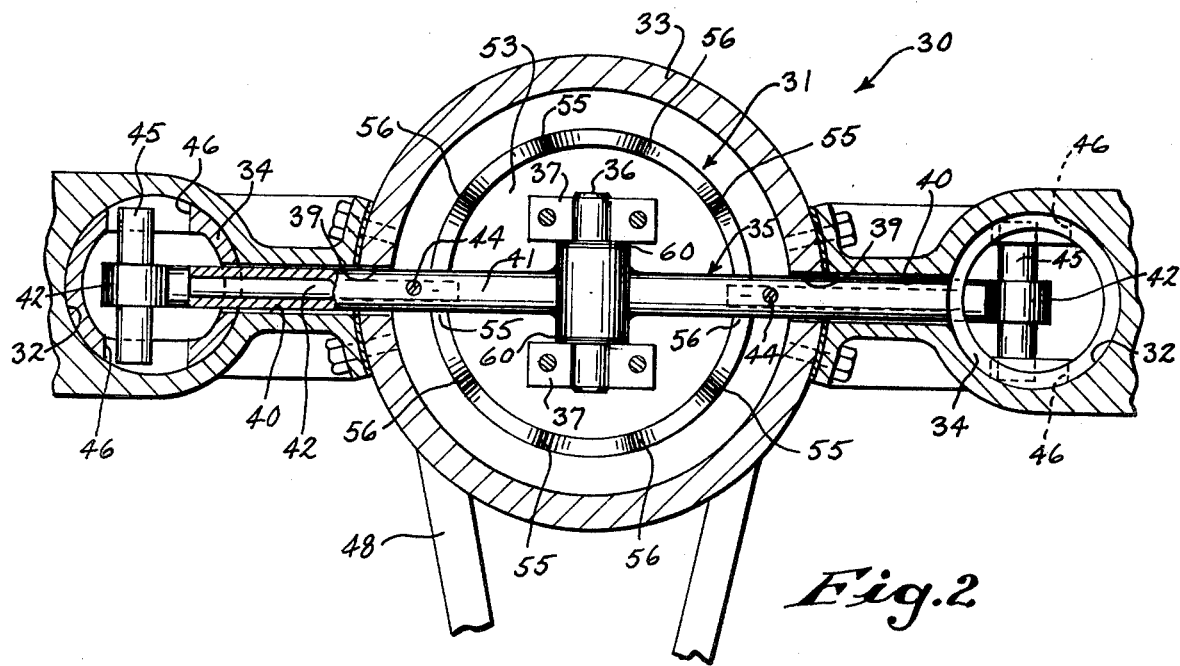
FIG. 2 is a sectional view taken generally on line 2—2 of FIG. 1.

Referring to the drawings, the compressor or pump 30 of FIGS. 1-3 includes a motion change transmission 31 for converting the rotary drive motion to a reciprocating pumping motion.

The compressor 30 includes a pair of cylinders 32 disposed oppositely relative to the intermediate framing assemblage or housing 33. Pistons 34 are slidably disposed in the respective cylinders 32 and reciprocate oppositely in a manner to be described. Suitable valving, not shown, in the cylinders 32 are coordinated with the movement of the pistons 34 to provide the pumping action.

The motion change transmission 31 includes the pivotal rod 35 provided with opposed trunnions 36 generally centrally thereof. The trunnions 36 of rod 35 are disposed in suitable spaced bearings 37 provided on the depending bifurcated projection 38 generally centrally of the housing 33. The rod 35 extends through the housing 33 and projects outwardly through the diametrically opposed openings 39 in the wall of the housing and through the corresponding passages 40 into the respective cylinders 32 for connection to the pistons 34.

The rod 35 may be circular in cross-section, as shown, and constitutes an assembly of multiple pieces. The intermediate portion 41 of rod 35 may be hollow at each end thereof as best shown in FIG. 2, for telescopingly receiving an extension member 42 that provides a transverse eye or hole 43 at the respective ends of the rod 35. The extension members 42 are secured to the intermediate rod portion 41 by the pins or keys 44. In appropriate circumstance and/or if so desired, the rod can be of one-piece, solid or hollow construction.

A transverse pin 45 extends through the eye or hole 43 at the respective ends of rod 35 and slidably engages within the opposed recesses 46 provided in the skirt 47 of the respective pistons 34. The pin and slot connection between the rod 35 and the pistons 34 accommodate pivotal movement of the rod with piston reciprocation within the cylinders 32.

The pump or compressor 30 is driven by a motive source, not shown, through the V-belt 48 drivingly engaged on the pulley 49 mounted on the vertical shaft 50 beneath the housing 33 as shown in FIG. 1. The shaft 50 extends upwardly into the housing 33 through the generally central opening 51 and the tapered roller bearing 52. A rotary member or rotor 53 is keyed onto the upper end of the shaft 50 by the pin 54 and rotates therewith. The mounting for the rotor 53 places its axis generally in alignment with the longitudinal center and pivot axis of the rod 35.

The rotor 53 is provided with a plurality of alternating, axially and circumferentially extending hills 55 and valleys 56 engageable with the rod 35. In the structure illustrated in FIGS. 1-3, five hills 55 are shown on the rotor 53 and the same are equiangularly spaced circumferentially. A hill 55 is considered to extend from the base of one valley 56 over its crest to the base of the next adjacent valley. Thus, for the rotor 53 having five hills 55, each hill extends over 72°. Each valley 56 is considered to extend from the crest of a hill 55 down over its base to the crest of the next adjacent hill. Thus, the valleys 56 of rotor 53 also extend over 72°. The arrangement as shown in FIGS. 1-3 provides that a valley 56 is diametrically opposed from each hill 55. Thus, as the rotor 53 rotates with the shaft 50, a given hill 55 will be effective to cause the rod 35 to pivot with the corresponding end of the rod traversing the effective hill and the opposite end of the rod simultaneously traversing the opposed valley 56. With continued rotation of rotor 53, the next effective hill 55 will engage the lower end of the rod 35 and cause the rod to pivot oppositely. With each revolution of the rotor 53, the pivoting rod 35 will have caused each of the pistons 34 to deliver five pressure pulses.

The rotor 53 with equiangularly spaced hills 55 and valleys 56 is well suited for the pump or compressor 30 of FIGS. 1-3. It is possible, however, that for other applications of the transmission 31, the rotor will require one or more crests that are extended and/or truncated to provide a dwell in which case the diametrically opposed valley must be correspondingly modified to control the rod 35. As one end of rod 35 is influenced by a hill, the opposite valley provides clearance for the other end of the rod and serves to aid in the control of backlash and momentary surges or backoffs at the output or input.

For the pump or compressor 30, the cylinders 32 and corresponding pistons 34 are disposed externally of the transmission housing 33. In applications where a relatively short piston stroke is more appropriate or desired, the cylinders may be disposed inside the housing 33 at any location along the rod 35.

Some adjustment must be provided for to assure proper operating correlation between the rod 35 and rotor 53. Proper vertical disposition therebetween can be provided for by shims 57 disposed between the bearing 52 and rotor 53 and/or shims 58 between the housing 33 and the bearing support cross-member 59. Proper lateral disposition between the rod 35 and rotor 53 can be attained with shims 60 on either or both of the rod trunnions 36 adjacent to the bearings 37.

In the embodiment of FIG. 4, the rod 35 is provided with relatively long trunnions 61 which are supported in the opposed bearings 62 provided in the wall of housing 63 and radially outward relative to the rotor 53. FIG. 5 shows an enlargement of the rotor 53 having five hills 55.

For purposes of illustration, FIGS. 1-5 all show the rotor 53 to have five hills 55. Depending on the application for the motion change transmission 31, such a rotor can have any number of hills from at least one hill on up.

While the rod 35 in FIGS. 1-4 is shown to have a circular cross-section, other cross-sectional configurations may well be equally suitable. Where rotor configuration of other conditions require it, the rod may be curved or stepped over its length.

While the portion of rotor 53 contacting the rod 35 and defined by hills 55 and valleys 56 constitutes an annular hollow or shell-like structure as shown in FIGS. 1-5, the rod contacting portion of rotor 64 in FIG. 6 is solid. The working surface 65 of rotor 64 is developed by a myriad of diametrically extending planes to form the alternating hills 66 and valleys 67 for driving the rod 35. For certain applications, a rod driving rotor 68 may be formed directly on the end of a shaft 69 as generally shown in FIG. 7.

FIG. 8 shows a possible alternative connection between the rod 35 and the pistons 34. An H-member slide 70 is assembled through the hole or eye 43 on the end of the rod 35 and is slidable in the opposed recesses 71 of the piston skirt 47.

FIGs. 9 and 10 show another possible alternative connection between the pivotal rod and the pistons 34. The pivotal rod 72 may be of one-piece construction and extends through the passage 40 and into the cylinders 32 where the free end of the rod passes through and is slidably disposed in the hole 73 of the cross-member 74 pivotally mounted in the piston 34.

Figure 11:
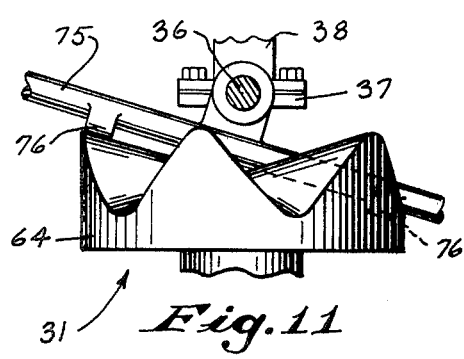
FIG. 11 is a detail view showing an embodiment wherein the rod is provided with a wear surface or shoe where it engages with the rotary member.

According to FIG. 11, the pivotal rod 75 is provided with a special wear surface or shoe 76 where it engages with rotor 64 to reduce the effects of friction between the rod and rotor.

Figure 12:
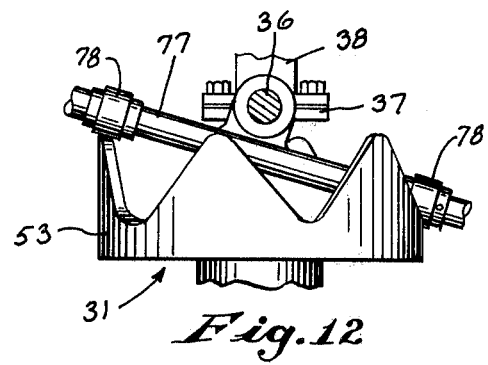
FIG. 12 is a detail view showing an embodiment wherein the rod carries wheels or rollers for engagement with the rotary member.
Figure 14:
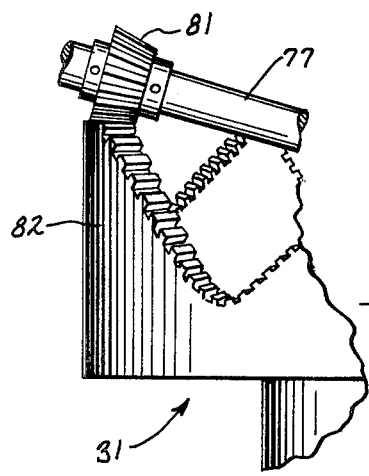
FIG. 14 is a detail view wherein the rod carries bevel gears that roll on correspondingly tooth surfaces of the rotary member.
Figure 13:
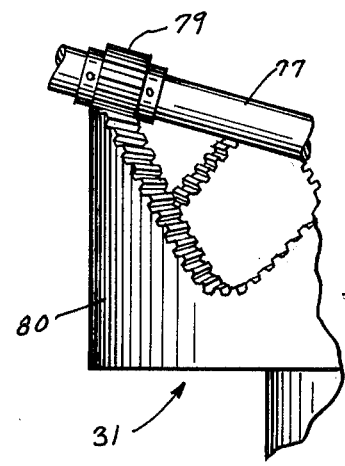
FIG. 13 is a detail view wherein the rod carries gears that roll on the toothed surfaces of the rotary member.
Figure 15:
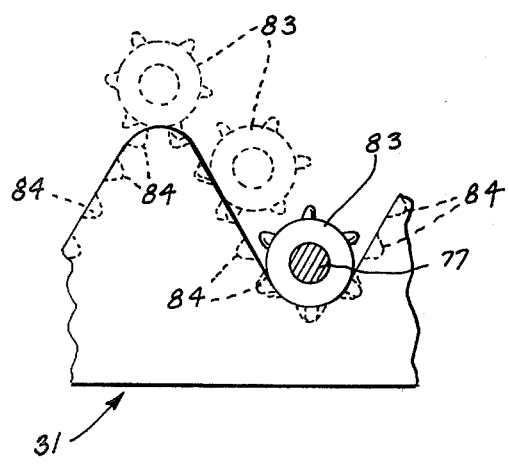
FIG. 15 is a detail view wherein the rod carries sprockets or lugged wheels engageable with the rotary member and in phantom shows how the rod changes position vertically as the rotary member rotates.
Figure 16:
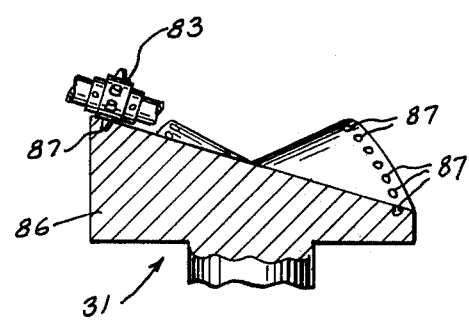
FIG. 16 is a detail view showing the sprockets or lugged wheels as might be used with the solid rotary member of FIG. 6.

In larger applications for the transmission 31, friction may be materially reduced if the pivotal rod 77 is provided with rotating members where it engages with the rotor. In FIG. 12, the rod 77 carries wheels or rollers 78 for engagement with the rotor 53. In FIG. 13, rotating gears 79 on the rod 77 roll on the toothed surface of the rotor 80. According to FIG. 14, the rod 77 carries rotatable bevel gears 81 which roll on the correspondingly toothed surface of the rotor 82. In FIG. 15, the rod 77 is provided with rotatable sprockets or lugged wheels 83 for engaging within corresponding depressions 84 in the rotor 85. FIG. 15 further shows in phantom how the rod 77 changes position vertically as the rotor 85 rotates. In FIG. 16, the rod 77 with sprockets or lugged wheels 83 is shown in combination with a solid rotor 86 having corresponding depressions 87.

If desired, the compressor or pump 30 may be provided with cylinders 88 as shown in FIGS. 17 for receiving a double acting piston 89 capable of delivering alternating pressure pulses at the respective ends thereof. In this construction, the pivotal rod 35 extends into the interior of the piston 89 and the transverse pin 45 is slidably disposed in the aligned, opposed slots 90 generally centrally intermediate the opposed heads 91 of the piston.

According to the embodiment of FIG. 18, a fulcrum member 92 has replaced the bearings 27 in FIGS. 1-3. The pivotal rod 93 is provided centrally with an angular notch or recess 94 for receiving the pivot point of member 92. The depth of the notch or recess 94 in the rod 93 extends generally to the plane defined by the working or contact surface on the rod. The pivotal rod 93 is rotationally confined within the passages 40 to the cylinders 32 or by other suitable means. Vertical adjustment between the rod 93 and the rotor 53 can be provided for by shims 95 between the fulcrum member 92 and the housing member 96.

Referring now to FIG. 19, the motion change transmission 97 is shown incorporated in an internal combustion engine 98 wherein linear piston motion is converted into rotary motion.

In FIG. 19, the engine cylinders 99 are disposed on opposite sides of the intermediate transmission housing 100. A piston 101 is disposed in each cylinder 99 and are caused to reciprocate oppositely in response to the firing of the spark plugs 102 in the head 103 of the cylinders. A rod 104 having opposed trunnions 105 at its longitudinal center is pivotally supported in suitable bearings 106 generally centrally within the housing 100. The rod 104 extends outwardly through the diametrically opposed openings 107 in the wall of the housing 100 and the aligned passages 108 and into the respective cylinders 99. The respective ends of the rod 104 carry a transverse pin 109 which extends through the eye 110 of the rod and is slidably disposed in the aligned opposed recesses 111 of the piston skirts 112. The connection of the rod 104 to the respective pistons 101 provides for rocking or pivoting of the rod in response to the opposed piston reciprocations.

The rocking or pivoting motion of the rod 104 is imposed on the rotor 113 keyed on the end of the shaft 114 by the pin 115. The rotor 113 with its alternating hills 116 and valleys 117 may be generally similar to the rotor 43 of FIGS. 1-5 and is driven rotationally by the rod 104 to drive the shaft 114. The shaft 114 extends through the opening 118 of the housing 100 and the roller bearing 119 to drive the pulley 120 or other rotary transmission element carried thereon.

The power output of engine 98 can be readily increased, if desired, by adding one or more cylinders, not shown, adjacently or in line with the cylinders 99. The several additional features shown in FIGS. 6-18 and described in connection with the compresor or pump 30 have equal application to the engine 98.

Figure 20:
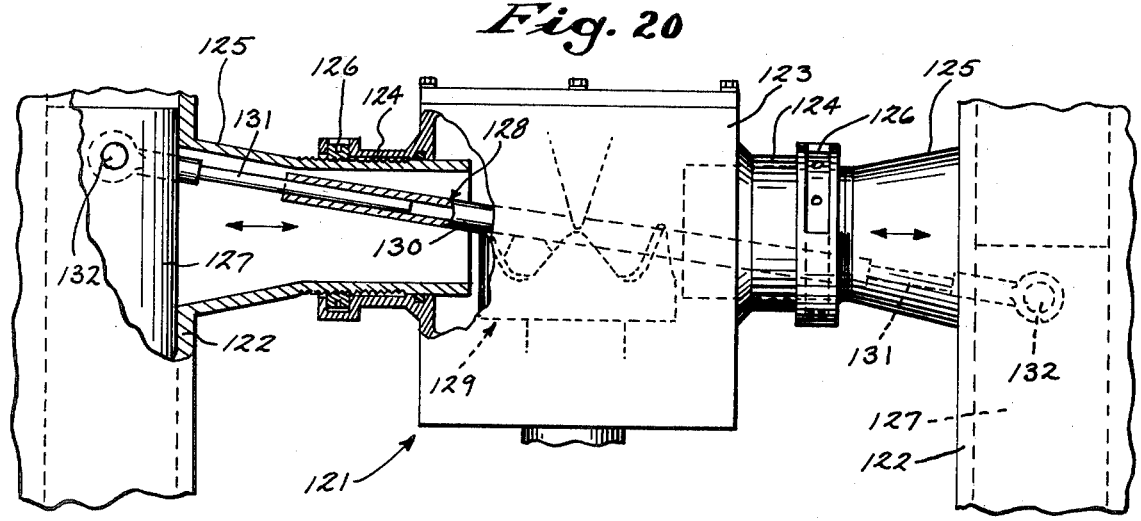
FIG. 20 is a side elevation with parts broken away and sectioned of an engine incorporating the motion change transmission of this invention and showing how the cylinder capacity of the engine can be varied even while the engine is running.
Figure 21:
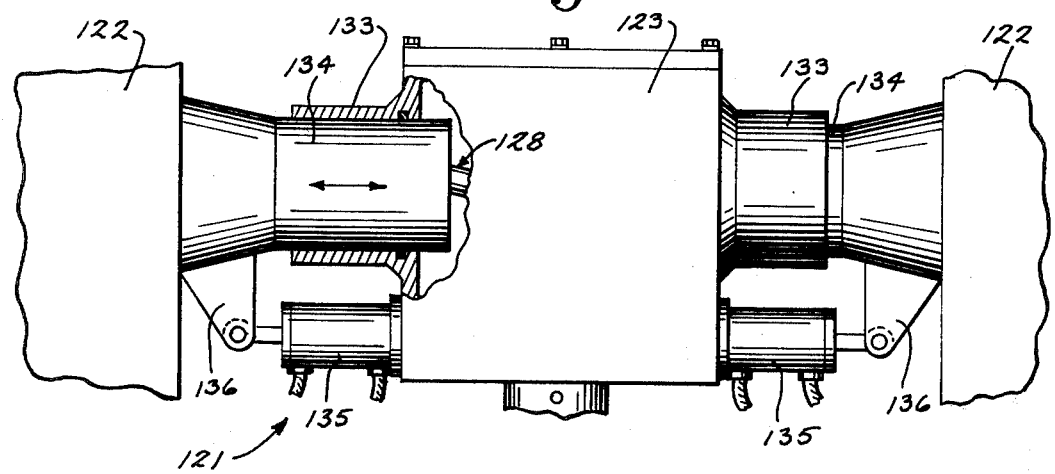
FIG. 21 is a side elevation partially in section of an engine generally similar to that of FIG. 20 and providing hydraulic means for varying the cylinder capacity of the engine.
Figure 22:
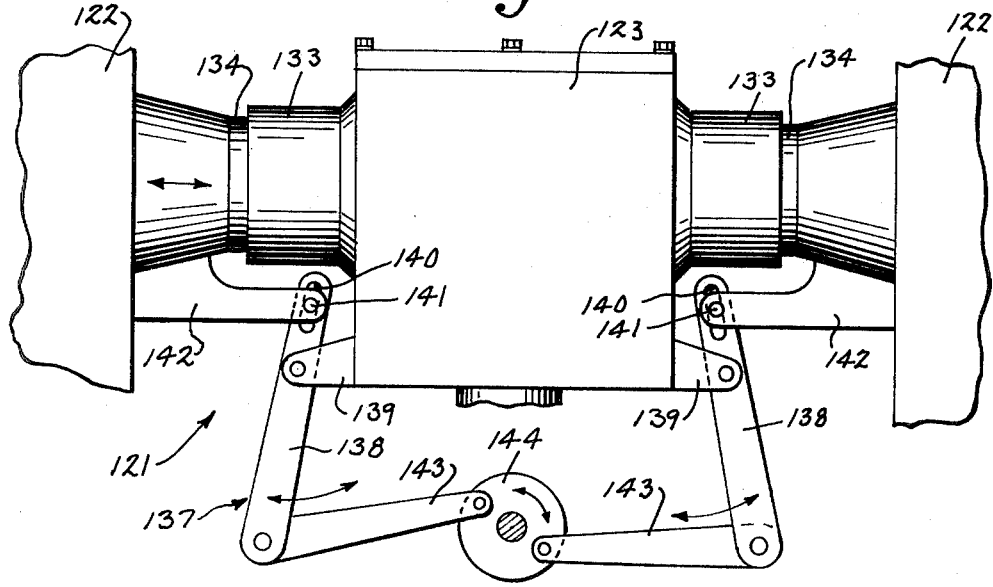
FIG. 22 is a side elevation of an engine generally similar to that of FIG. 20 and showing mechanical linkage means for varying the cylinder capacity of the engine.

According to FIGS. 20-22, an engine 121 incorporating the motion change transmission of this invention permits change in piston stroke and/or cubic capacity even while the engine is running to enhance the efficiency of the unit.

Referring to FIG. 20, the movable engine cylinders 122 are disposed oppositely relative to the intermediate transmission housing 123 having opposed tubular projections 124 that open into the housing. The respective cylinders 122 have corresponding tubular projections 125 which are telescopingly received within the housing projections 124. The cylinder projections 125 are threaded externally over at least a portion of their length and are threadedly engaged by the collars 126 rotatably supported by the housing projections 124. Rotation of the collars 126 in either direction by means, not shown, effects movement of the cylinders 122 in a corresponding direction relative to the housing 123. With movement of the cylinders 122, the stroke of pistons 127 is correspondingly varied to alter the cubic capacity confined by the pistons in the respective cylinders.

To accommodate stroke variations of pistons 127 in FIG. 20, the rod 128 of transmission 129 extends through the projections 125 and is provided with the capacity to change its length in accordance with such variations. The rod 128 includes a central portion 130 of which at least the end portions are hollow to telescopingly receive the respective extendible end portions 131 connected to the pistons 127 by the transverse pins 132 that provide for pivotal motion between the rod and piston. If desired, the rod 128 could be of one-piece construction when utilizing a rod to pistion connection as shown in FIGS. 9 and 10.

The engine 121 in FIG. 21 provides for telescoping movement between the tubular projections 133 and 134 provided on the transmission housing 123 and cylinders 122 respectively to provide for change in piston stroke. Movement of the cylinders 122 relative to housing 123 in FIG. 21 is effected hydraulically by the double acting piston-cylinder units 135 disposed between the housing and the projections 136 on the respective cylinders.

In the engine 121 of FIG. 22, telescoping movement between the tubular projections 133 and 134 on the transmission housing 123 and cylinders 122, respectively, to provide for change in piston stroke is effected through a mechanical linkage arrangement 137. The linkage arrangement 137 includes a link member 138 corresponding to each of the cylinders 122 and pivotally supported intermediate their length on the opposed projections 139 from the housing 123. The upper ends of the generally vertical link members 138 are provided with a slot 140 engageable by the slidable pins 141 on the projections 142 from the respective cylinders 122. A second link member 143 has one end thereof pivotally connected to the lower end of each link member 138. The opposite ends of the second link members 143 are pivotally connected to diametrically opposite locations on a pivotal control member 144. Pivotal movement of the control member 144 will effect corresponding movement of the cylinders 122 relative to the housing 123 through the linkage arrangement 137 to provide for the desired piston stroke even while the engine 121 is running.

While FIGS. 20-22 are described as relating to an engine, it should be understood that the piston stroke for the pump and/or compressor 30 could be similarly varied, if desired.

FIGS. 23-28 show a number of possible variations for the transmission of this invention.

Figure 23:
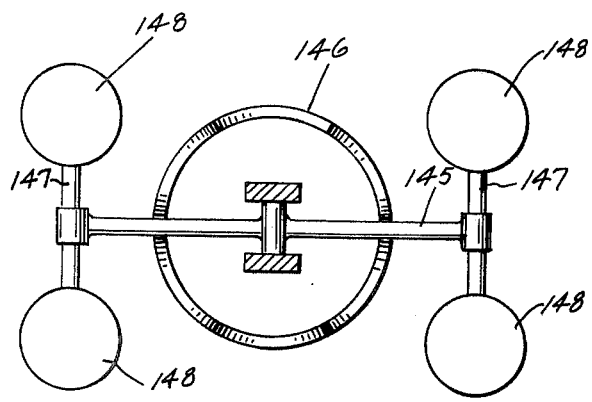
FIG. 23 is a diagrammatic view of the transmission of this invention wherein the ends of the pivotal rod carry transverse members, each of which is connected to a pair of transversely spaced reciprocating members.

According to FIG. 23, the pivotal rod 145 is engageable with the face of the rotor 146 in the manner described in connection with the previous embodiments. The respective ends of rod 145 each carry transverse members 147 which in turn are each connected to transversely spaced reciprocating members such as the pistons of the cylinder-piston combinations 148.

Figure 24:
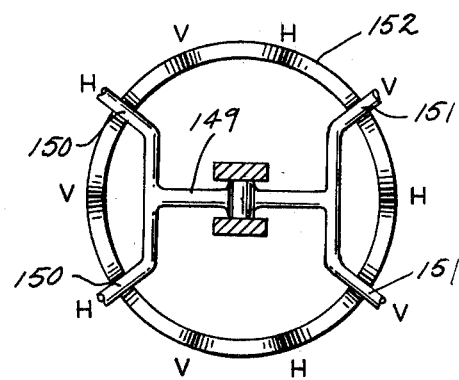
FIG. 24 is a diagrammatic view of the transmission of this invention wherein the ends of the pivotal rod are bifurcated.

If FIG. 24, the pivotal rod 149 has the respective end portions thereof bifurcated to provide the branched ends 150 at one end thereof and the branched ends 151 at the other end thereof. The rod 149 is operatively engageable with the face of rotor 152 having five (5) hills H and five (5) valleys V generally as shown. The branched ends of rod 149 are spaced such that when the ends 150 are traversing adjacent hills, the ends 151 are simultaneously traversing the diametrically opposed adjacent valleys. The respective branched ends 150 and 151 may each be converted to reciprocating members such as the pistons of cylinder-piston combinations, not shown.

Figure 25:
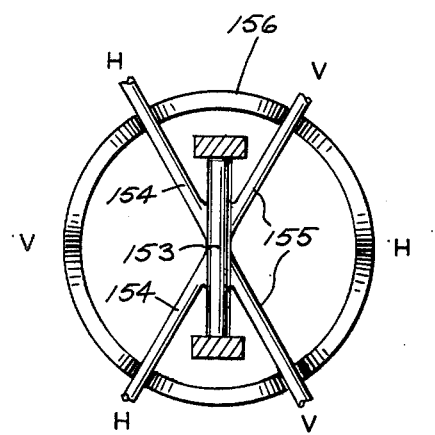
FIG. 25 is a diagrammatic view of the transmission showing a pivotal rod having still another form of bifurcated ends.

FIG. 25 shows another form of pivotal rod 153 having bifurcated end portions with the forked ends 154 being opposed to the ends 155. The face of the rotor 156 of FIG. 25 is provided with three (3) hills H and three (3) valleys V generally as indicated. As generally described in connection with FIG. 24, the forked ends of rod 153 are spaced such that when the ends 154 are traversing adjacent hills, the ends 155 are simultaneously traversing the diametrically opposed adjacent valleys. The respective ends 154 and 155 are also connected to reciprocating members, not shown.

In the transmissions heretofore described, the pivotal rods 35, 104, 128 and 145 were generally straight as they extended transversely relative to the corresponding rotors. In the respective arrangements for a generally straight pivotal rod, the corresponding rotors generally require an odd number of hills and valleys so that each hill has a diametrically opposed valley. Such is also generally true for the arrangements of FIGS. 24 and 25 where the rods 149 and 153 are symmetrically forked at the opposed ends thereof.

Figure 26:
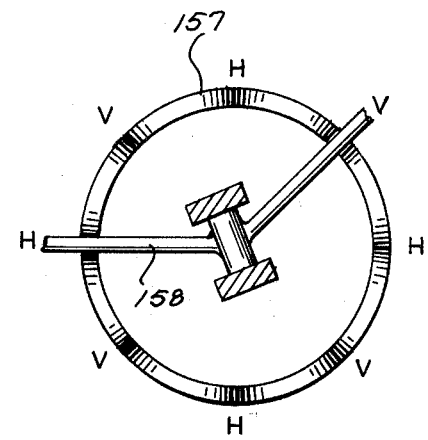
FIG. 26 is a diagrammatic view of the transmission wherein the pivotal rod is angular.

In the transmission of FIG. 26, the rotor 157 has an even number of hills and valleys, four (4) hills H and four (4) valleys V being indicated. With even numbers of hills and valleys, the rotor 157 has hills diametrically opposed from each other and valleys also so opposed to preclude the use of generally straight pivotal rods. Thus, transverse pivotal rod 158 is angular as viewed in FIG. 26 to provide that when the one end thereof is transversing a hill of rotor 157, the opposite end thereof will be simultaneously traversing a valley. It is contemplated that the respective ends of pivotal rod 158 will be connected to reciprocating members, not shown.

Figure 27:
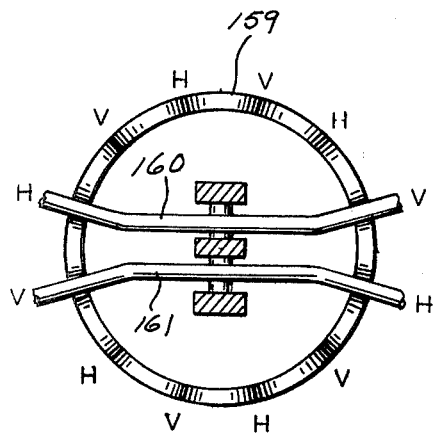
FIG. 27 is a diagrammatic view of the transmission wherein a pair of pivotal rods are employed.
Figure 28:
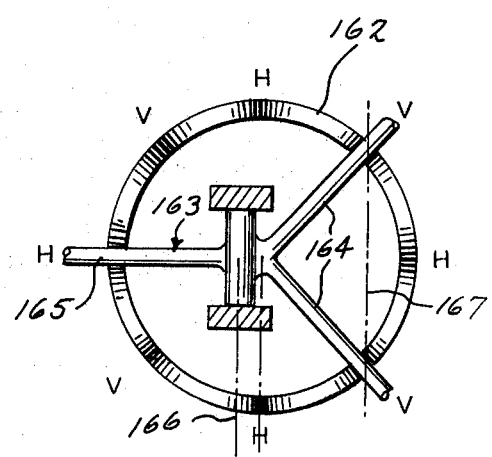
FIG. 28 is a diagrammatic view of the transmission wherein only one end of the pivotal rod is bifurcated and the pivot for the rod is offset from the rotor axis so that both ends of the rod will remain in contact with the rotor.

FIGS. 27 and 28 also contemplate rotors having an even number of hills and valleys. According to FIG. 27, the face of rotor 159 is provided with six (6) hills H and six (6) valleys V, as generally indicated, and a pair of parallel pivotal rods 160 and 161 are engageable therewith. The parallel rods 160 and 161 are spaced symmetrically with respect to the axis of rotor 159 and have end portions that extended radially with respect to the rotor such that when one end of each rod traverses a hill, the opposite end traverses a valley. Since the corresponding ends of the rods 160 and 161 engage with an adjacent hill and valley of rotor 159, the rods will rock or pivot oppositely relative to each other. FIG. 27 also indicates that where but a single pivotal rod is required as in FIG. 26, the central portion of the rod can be straight when suitably offset from the axis of the rotor.

The face of the rotor 162 of FIG. 28 is provided with four (4) hills H and four (4) valleys V generally as indicated. The corresponding pivotal rod 163 is bifurcated at one end thereof to provide the forked end portions 164 opposed from the single end portion 165. As generally shown in FIG. 28, the pivot axis 166 for the rod 163 must be offset with respect to the axis of the rotor 162 to place the rod pivot axis 166 midway between the rotor contact location for the single end portion 165 and the dual rotor contact location for the forked end portions 164 as represented by the dot-dash line 167. The forked end portions 164 are so spaced that when the single end portions 165 of rod 163 are traversing a hill of rotor 162, the spaced portions 164 will simultaneously be traversing the adjacent valleys on opposite sides of the diametrically opposed hill.

In the embodiments of FIGS. 23-28, when means are provided for driving the respective rotors, the transmissions provide for the conversion of rotary motion to reciprocating motion. And when means are provided for driving the reciprocating members, the transmissions provide for the conversion of reciprocating motion to rotary motion.

Various modes of carrying out the invention are contemplated as being within the scope of the following claims particularly pointing out and distinctly claiming the subject matter which is regarded as the invention.

I claim:

1. In a motion change transmission, a framing assemblage, a rotor rotatably supported by the assemblage and having a face provided with alternating, axially and circumferentially extending hills and valleys, at least one rod disposed transversely relative to the rotor and being pivotally supported by the assemblage, said rod being operatively engageable with the face of the rotor such that when one end of the rod traverses a rotor hill the other end of the rod simultaneously traverses a rotor valley, pivot means carried by the assemblage for supporting the rod for pivoting movement relative to the rotor, said pivot means including a pivot shaft connected to said rod and projecting laterally from both sides of the rod, and said pivot means having spaced bearings connected to the framing assemblage for journalling the ends of the pivot shaft, and means for connecting at least one end of the rod to a reciprocating member, said connecting means accommodating pivotal movement of the rod and reciprocating movement of the member, and means to guide the reciprocating member in linear reciprocating movement.

2. The structure as set forth in claim 1 wherein at least one end of the rod is bifurcated such that when one end of the rod traverses a rotor hill the bifurcated end of the rod simultaneously traverses a pair of adjacent rotor valleys.

3. The structure as set forth in claim 1 wherein the face of the rotor carries an even number of hills and valleys, and the opposed ends of the transverse rod extend angularly relative to each other.

4. The structure as set forth in claim 1 wherein the face of the rotor carries an even number of hills and valleys, and the transverse rod is offset from the axis of the rotor with the pivot axis of the rod extending normal to and being aligned with the rotor axis.

5. The structure as set forth in claim 1 wherein the face of the rotor carries an even number of hills and valleys, and a pair of generally parallel rods are disposed transversely relative to the rotor and pivotally supported by the assemblage, said rods being offset symmetrically relative to the rotor axis and having their pivot axes extending normal to and aligned with the rotor axis.

6. The structure as set forth in claim 1 wherein the face of the rotor carries an odd number of hills and valleys, and the rod is bifurcated at both ends thereof such that when one bifurcated end of the rod traverses adjacent rotor hills the other bifurcated end of the rod simultaneously traverses adjacent rotor valleys.

7. The structure set forth in claim 1, wherein the face of the rotor carries an odd number of hills and valleys.

8. The structure as set forth in claim 1 wherein at least one end of the pivotal rod is connected to a reciprocating member and means are provided for driving the rotor so that the transmission provides for the conversion of rotary motion to reciprocating motion.

9. The structure as set forth in claim 8 wherein the rotor comprises a solid structure.

10. The structure as set forth in claim 1, wherein means are provided for driving the reciprocating member so that the transmission provides for the conversion of reciprocating motion to rotary motion.

11. The structure as set forth in claim 1 wherein the reciprocating member is a piston and the connecting means comprise a transverse pin carried by the end of the rod and engageable within opposed slots in the wall of the piston.

12. The structure as set forth in claim 1 wherein the reciprocating member is a piston and the connecting means comprise an H-member slide having a center leg extending transversely through the rod and being pivotal therein and opposed side legs engageable within opposed slots in the wall of the piston.

13. The structure as set forth in claim 1, wherein the reciprocating member is a piston and the connecting means comprise a cross-member pivotally carried by the piston and having a hole generally centrally thereof and the rod is slidably disposed in said hole.

14. The structure as set forth in claim 1 wherein the rotor comprises a shaft having the hills and valleys formed on the end thereof.

15. The structure as set forth in claim 1 wherein the rod is provided with wear resistant shoes for sliding engagement with the rotor hills and valleys.

16. The structure as set forth in claim 1 wherein the rod is provided with rotatable wheels disposed concentrically of the rod for rolling engagement with the rotor hills and valleys.

17. The structure as set forth in claim 1 wherein the rod is provided with rotatable gears having teeth in meshing engagement with corresponding teeth formed on the rotor hills and valleys.

18. The structure as set forth in claim 17 wherein the gears provided on the rod are bevel gears.

19. The structure as set forth in claim 1 wherein the rod is provided with rotatable sprockets having lugs in meshing engagement with corresponding depressions provided on the rotor hills and valleys.

20. The structure as set forth in claim 1 wherein the framing assemblage comprises a housing for enclosing the rotor and said spaced bearings are disposed in the wall of the housing.

21. The structure of claim 1, wherein at least one end of the pivotal rod is pivotally connected to a pair of reciprocating members, said pair of reciprocating members being out of axial alignment.

22. The structure of claim 1, wherein the pivot means is spaced from the rotor, and said structure includes means for adjusting the spacing between the rotor and pivot means in a direction parallel to the axis of the rotor.

23. The structure of claim 1, and including adjusting means for adjusting the position of the rod in a direction lateral to the axis of the rod.

24. In a pump or compressor, a housing, a rotor rotatably supported within the housing and having a face provided with alternating, axially and circumferentially extending hills and valleys, at least one rod disposed transversely relative to the rotor and being pivotally supported by the housing, said rod being operatively engageable with the face of the rotor such that when one end of the rod traverses a rotor hill, the other end of the rod simultaneously traverses a rotor valley, pivot means carried by the housing for supporting the rod for pivoting movement relative to the rotor, said pivot means including a pivot shaft connected to said rod and projecting laterally from both sides of the rod, and said pivot means having spaced bearings connected to the housing for journalling the ends of the pivot shaft, a cylinder corresponding to each end of the rod and disposed in alignment with the corresponding end of the rod and parallel to the rotor axis, pistons reciprocally disposed in said cylindrs, and means connecting the respective ends of the rod to the corresponding pistons and accommodating the pivotal movement of the rod and the reciprocating movement of the pistons, and means to drive the rotor.

25. The structure as set forth in claim 24 wherein the cylinders are disposed outside of the housing and communicate therewith through passages and the rod extends through said passages for connection to the respective pistons.

26. In an internal combustion engine, a housing, a rotor rotatably supported within the housing and having a face provided with alternating, axially and circumferentially extending hills and valleys, at least one rod disposed transversely relative to the rotor, pivot means to pivotally connect the rod to the housing, said rod being operatively engageable with the face of the rotor such that when one end of the rod traverses a rotor hill the other end of the rod simultaneously traverses a rotor valley, a cylinder corresponding to each end of the rod, pistons reciprocally disposed in said cylinders, and means connecting the respective ends of the rod to the corresponding pistons and accommodating the pivotal movement of the rod and the reciprocating movement of the pistons, means for driving the pistons, and means for adjusting the relative position of the rotor and said pivot means to vary the timing of the engine.

27. The structure as set forth in claim 26 wherein the rod is pivotal on a fulcrum member supported by the housing.

28. The structure as set forth in claim 26 wherein the pistons are double acting pistons whereby the rod is moved pivotally or rocked in both directions by power strokes of the pistons, each piston having a generally cylindrical body with a head at opposite ends of said body, said means for accommodating pivotal movement of the rod comprising a slot in the cylindrical body and extending generally normal to the axis of the body, and a pin connected to said rod and disposed for sliding movement in said slot.

29. The structure as set forth in claim 26 wherein the rod is extendible and the respective cylinders and movable in a plane defined by the corresponding end of the rod and the rotor axis to effect a corresponding variation in the piston stroke even while said engine is running.

30. The structure as set forth in claim 26 wherein the rod is extendible and the respective cylinders communicates with the housing through passages are formed by opposed telescopingly engaged tubular members provided on the housing and the cylinders respectively, said tubular members abeing relatively movable to effect a corresponding variation in the piston stroke even while said engine is running.

31. The structure as set forth in claim 30 wherein the inner tubular members are threaded externally and the outer tubular members rotatably support an internally threaded collar threadedly engaged on the corresponding inner tubular member, said collars being rotatable to move the cylinders relative to the housing.

32. The structure as set forth in claim 31 wherein the inner tubular members are provided on the cylinders and the outer tubular members are provided on the housing.

33. The structure as set forth in claim 30 wherein the opposed telescopingly engaged tubular members connecting the respective cylinders to the housing are movable by hydraulic means.

34. The structure as set forth in claim 33 wherein said hydraulic means comprise a cylinder-piston combination unit disposed between the respective cylinders and the housing.

35. The structure as set forth in claim 30 wherein the opposed telescopingly engaged tubular members connecting the respective cylinders to the housing are movable by linkage means.

36. The structure as set forth in claim 35 wherein said linkage means include a link member connecting the respective cylinders and the housing, said link members being further connected to a common control element.

* * * * *

UNITED STATES PATENT AND TRADEMARK OFFICE
CERTIFICATE OF CORRECTION

PATENT NO. : PETER J. HARDT

DATED : 4,185,508

INVENTOR(S) : January 29, 1980

It is certified that error appears in the above-identified patent and that said Letters Patent are hereby corrected as shown below:

Column 6, line 43, Cancel "pistion" and substitute therefor ---piston---, Column 7, line 62, Cancel "transversing" and substitute therefor ---traversing---, Column 10, line 39, CLAIM 24, Cancel "cylindrs" and substitute therefor ---cylinders ---, Column 11, line 19, CLAIM 30, Cancel "are", Column 11, line 22, CLAIM 30, Cancel "abeing" and substitute therefor ---being---

Signed and Sealed this

Twenty-eighth Day of October 1980

[SEAL]

Attest:

SIDNEY A. DIAMOND

Attesting Officer

Commissioner of Patents and Trademarks